Aug. 6, 1940.   L. L. L. NAVARIN   2,210,772
STORAGE BATTERY
Filed Aug. 18, 1936   2 Sheets-Sheet 1

Inventor:
Louis Leon Lucien Navarin

Aug. 6, 1940.   L. L. L. NAVARIN   2,210,772
STORAGE BATTERY
Filed Aug. 18, 1936   2 Sheets-Sheet 2

Inventor
Louis Leon Lucien Navarin

Patented Aug. 6, 1940

2,210,772

UNITED STATES PATENT OFFICE 2,210,772

STORAGE BATTERY

Louis Léon Lucien Navarin, Paris, France, assignor to Société des Accumulateurs Fixes et de Traction, Romainville, France Application August 18, 1936, Serial No. 96,646
In France August 21, 1935

2 Claims. (Cl. 136—6)

This invention relates to alkaline storage batteries of great capacity and more particularly to the cells of such batteries.

By reason of the nature of the electro-chemical reactions of which the battery plate is the seat, all manufacturers of alkaline storage batteries of whatever type have been brought in practice to make the plate, which is the essential part of the cell, of small pockets or tubes made of perforated band-steel to contain the active material, said pockets or tubes being juxtaposed in layers and having their extremities firmly seated in a rigid frame of sheet-steel. A storage plate may therefore be characterized from a strictly electrical point of view by the placing in parallelism by means of a frame of a plurality of small pockets or tubes which are juxtaposed in layers.

The cell of an alkaline storage battery generally comprises a plurality of plates, those of the same polarity being always interconnected by means which shall insure their being connected in parallel from an electrical point of view. The collector means which makes of the plates an integral whole both from a mechanical and an electrical point of view is always located at the top of the frame where there is provided for this purpose an appendage called "frame-head" or "plate-head."

These general characteristics of construction, which have been adopted by all manufacturers of alkaline storage batteries strictly limit the available energy of the alkaline cell for the following reasons:

(a) The available energy of the constituent of the plate (small pocket or tube) is limited. In the elementary constituents of the plate (small pockets or tubes) the reception and the emission of the current are insured by the perforated conductive walls of band-steel of said pockets or tubes, and it is evident that the section of these conductive parts must be proportioned to the intensity of the current which passes through them. However, when for example the storage battery must be discharged in a very short time an increase in the section of said band-steel offers insurmountable obstacles. In practice, in order to insure accurate operation of the pocket or tube, the manufacturer is compelled to work out his constituent parts while keeping his dimension figures within certain limits as regards thickness, width and length, these being appreciably the same in the case of all manufacturers. These maximum dimensions closely limit the useful energy of the pocket or tube.

(b) In a plate the number of small pockets or tubes juxtaposed in layers cannot be increased indefinitely. The electrical operation of the plate is insured by means of the frame which distributes the charging current and collects the discharging current emanating from the small pockets or tubes. The frame being necessarily made of thin band-steel, consequently of poor electrical conductivity, because of construction requirements (bulk, weight) can offer the electric current but a very limited section for its passage. As a result it is absolutely necessary to confine one's self to a relatively small number of small pockets or tubes seated in the same frame in order to avoid inadmissible drops in the voltage and a rise in temperature incompatible with accurate operation of the plate.

(c) In a cell the number of plates electrically connected in parallel must be limited. The device which insures the connection between the plates so that they shall be electrically connected in parallel consists in practice of a steel member called a junction. In order to avoid the same objections as those described under (b) above, the manufacturer must limit the number of plates to be connected to each other.

It is believed that from the above it will be clear that the standard principles of construction of alkaline cells as above set forth, considering the maximum possibilities to be expected from the component parts of the cell (small pockets or tubes, frame, plate and junction device) will not permit the practical realization of an alkaline cell having a capacity superior to about 1000 a. h. This greatly limits the field of uses to which an alkaline storage battery can be applied.

The present inventiton avoids all of the above specified objectionable features inherent to the principles of construction heretofore used, and the invention has for its object among other things to provide a storage battery cell having the greatest possible power for the smallest possible bulk.

The cell to which the present invention relates comprises a series of positive and negative plates of the greatest possible dimensions compatible with a satisfactory and efficient operation. One of the features of the invention resides in the fact that said series of plates is subdivided into a plurality of independent groups of plates, said groups being superposed in a plurality of layers and interconnected in parallel within the same box or jar.

The invention and its aims and objects will be readily understood from the following description, taken in connection with the accompanying drawings of an illustrative embodiment of the invention, the true scope of the invention being pointed out in the appended claims.

Figure 1:
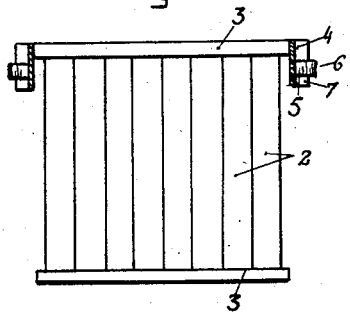
Fig. 1 is a front elevation of an assemblage of seven positive plates of a cell group.
Figure 2:
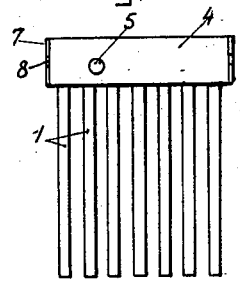
Fig. 2 is a side view of the parts shown in Fig. 1.

Referring more particularly to Figs. 1 and 2, each positive plate 1 comprises a series of small pockets or tubes 2 seated in a frame formed by two band-steel connectors 3, 3. The ends of one of said connectors project slightly beyond the tube structure and are suitably joined to junctions 4 which interconnect the positive plates 1 of the same group, so that each group thus presents two junctions 4 located at each side of the group at the upper part thereof. Each of said junctions is provided with a cell terminal comprising an appendage 5 terminating in a threaded portion 6 and presents at each extremity an ear 7 having a perforation 8 serving to assemble said group with the adjoining groups of the same layer.

Figure 3:
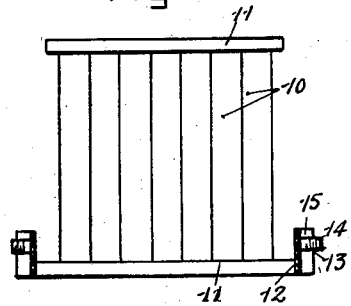
Fig. 3 is a front elevation of an assemblage of eight negative plates of a cell group.
Figure 4:
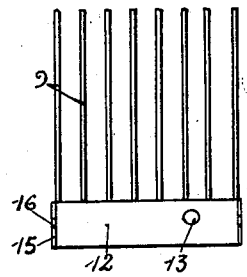
Fig. 4 is a side view of the parts shown in Fig. 3.

In the same manner each negative plate 9 (see Figs. 3 and 4) comprises a series of small pockets or tubes 10 seated in a frame formed of two band-steel connectors 11. The ends of one of said connectors project slightly beyond the tube structure and are connected to junctions 12 which interconnect the negative plates 9 of the same group, so that each group thus presents two junctions 12, 12 at each side of the group near its lower portions; each of these junctions is provided with an appendage 13 terminating in a threaded portion 14 and presents at each extremity an ear 15 having a perforation 16.

Figure 5:
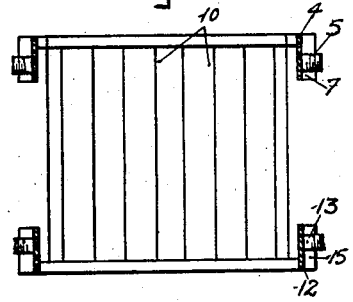
Fig. 5 is a front elevation of a complete cell group with its positive and negative plates and its junctions or connections.
Figure 6:
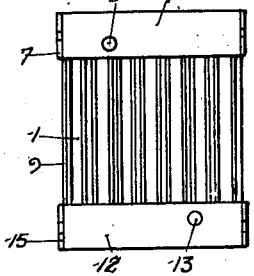
Fig. 6 is a side view of the parts shown in Fig. 5.
Figure 7:
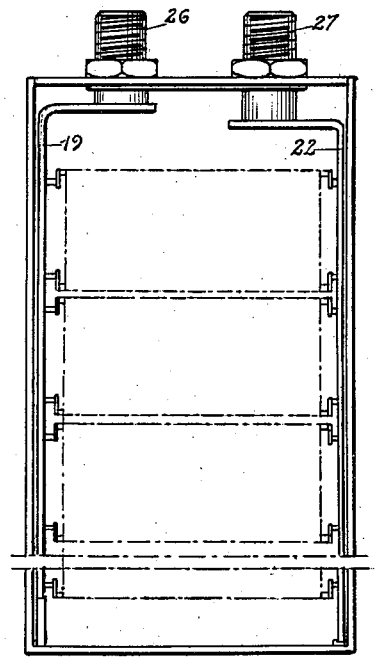
Fig. 7 is a front elevation of a cell of a possible capacity of 10,000 a. h. and comprising twenty-four groups distributed in eight layers of three joined groups.

The positive and negative plates forming a group are assembled in their normal positions for use, as shown in Figs. 5 and 6.

In each of the eight layers of the cell herein described by way of illustration, the three cell groups A, B, and C of a layer which are identical with the group shown in Figs. 5 and 6, are connected (see Fig. 8) by bolts and nuts comprising the bolts and nuts 17 which extend through the perforations 8 of the juxtaposed ears 7 and interconnect the positive junctions 4 and the bolts and nuts 18 which extend through the perforations 16 of the juxtaposed ears 15 and interconnect the negative junctions 12.

The superposed groups A, A' ..., B, B' ... etc. of the several layers are interconnected by general positive and negative connections which make an integral whole of the several layers, forming thus the supports for the different groups.

The general positive connections referred to are formed by vertical bars 19 provided with a perforation at each layer to correspond with the cell terminal 5, so as to be able to be connected to the junctions 4 by nuts 20 adapted to be screwed on the threaded heads 6; in the illustrative embodiment herein shown the cell comprises at each side three general positive connections 19 which are interconnected at their tops by a collector 21.

The general negative connections are formed by vertical bars 22 provided with a perforation at each layer to correspond to the cell terminal 13, so as to be able to be connected to the junctions 12 by nuts 23 adapted to be screwed on the threaded heads 14; in the illustrative embodiment shown the cell comprises on each side three general negative connections 22 interconnected at their tops by a collector 24.

Figure 8:
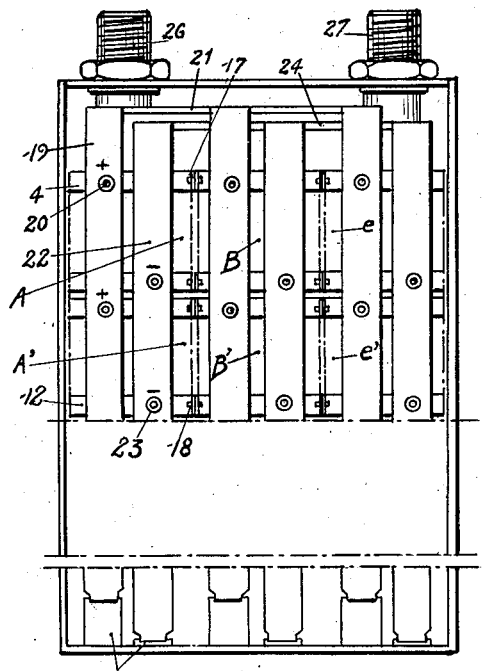
Fig. 8 is a side view of the construction shown in Fig. 7.

The cell is supported within the box or jar by props 25 of ebonite for example which rest upon the bottom of said box and support the bars such as 19 and 22 (Fig. 8).

Figure 9:
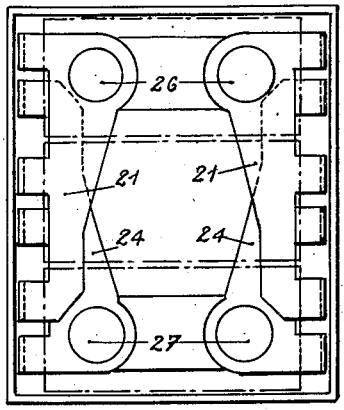
Fig. 9 is a plan view of the construction shown in Fig. 7.

The bars 19 are connected to the general positive terminals 26 of the cell by means of collectors 21 and the bars 22 are connected to the general negative terminals 27 by means of collectors 24 (see Figs. 8 and 9).

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the true scope of the invention.

I claim:

1. An alkaline storage battery cell of great capacity comprising, in combination, plates consisting of a plurality of tubes, a frame in which said tubes are fixed, said plates being assembled in sets comprising each several positive plates and negative plates electrically connected, each of said sets forming a compact mechanical unit in which the plates are positioned vertically, and said compact mechanical units being themselves superposed one above another in at least two tiers within one and the same box and electrically connected in parallel.

2. An alkaline storage battery cell, of great capacity, comprising, in combination, plates consisting of a plurality of grid elements, a frame in which said grid elements are fixed, said plates being assembled in sets comprising each several positive plates and negative plates electrically connected, each of said sets forming a compact mechanical unit in which the plates are positioned vertically, and said compact mechanical units being themselves superposed one above another in at least two tiers within one and the same box and electrically connected in parallel.

LOUIS LÉON LUCIEN NAVARIN.